United States Patent
Davidovits et al.

(10) Patent No.: US 9,116,301 B2
(45) Date of Patent: Aug. 25, 2015

(54) DURABLE LIGHT-POLARIZING ARTICLES AND METHOD OF MAKING THE SAME

(71) Applicant: Corning Incorporated, Corning, NY (US)

(72) Inventors: Jerome Vivien Davidovits, Bois le Roi (FR); David Henry, Fontaine le Port (FR); Eric Gesell, Chaintreaux (FR); Philippe Sinard, Cesson (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/310,453

(22) Filed: Jun. 20, 2014

(65) Prior Publication Data

US 2014/0302248 A1  Oct. 9, 2014

Related U.S. Application Data

(62) Division of application No. 12/174,959, filed on Jul. 17, 2008, now abandoned.

(60) Provisional application No. 60/966,049, filed on Aug. 24, 2007.

(51) Int. Cl.
*B05D 5/06* (2006.01)
*G02B 5/30* (2006.01)
*B05D 1/00* (2006.01)
*B05D 1/18* (2006.01)
*B05D 3/06* (2006.01)

(52) U.S. Cl.
CPC ............... *G02B 5/305* (2013.01); *B05D 1/005* (2013.01); *B05D 1/18* (2013.01); *B05D 3/067* (2013.01); *B05D 5/06* (2013.01); *G02B 5/3033* (2013.01); *Y10T 428/269* (2015.01); *Y10T 428/31551* (2015.04); *Y10T 428/31601* (2015.04)

(58) Field of Classification Search
CPC ............................................ G02B 5/30–5/3091
USPC ....................................................... 427/163.1
See application file for complete search history.

(56) References Cited

U.S. PATENT DOCUMENTS

| | | | |
|---|---|---|---|
| 4,683,153 A * | 7/1987 | Goepfert et al. | 428/1.31 |
| 6,187,444 B1 * | 2/2001 | Bowles et al. | 428/423.1 |
| 2004/0096666 A1 * | 5/2004 | Knox et al. | 428/412 |
| 2006/0146234 A1 * | 7/2006 | Bear et al. | 349/96 |
| 2006/0182902 A1 * | 8/2006 | Yoneyama et al. | 428/1.31 |
| 2007/0269616 A1 * | 11/2007 | Nakano et al. | 428/1.31 |

* cited by examiner

*Primary Examiner* — Elizabeth Burkhart
(74) *Attorney, Agent, or Firm* — Kevin L. Bray

(57) ABSTRACT

Described herein are polarizing articles and methods of making the same. The methods are useful in preparing polarizing articles having high durability and increased polarizing efficiency. The polarizing articles are useful in any article where it is desirable to reduce or remove glare.

14 Claims, 1 Drawing Sheet

DURABLE LIGHT-POLARIZING ARTICLES AND METHOD OF MAKING THE SAME

CROSS-REFERENCE TO RELATED APPLICATIONS

This application is a divisional of U.S. patent application Ser. No. 12/174,959, filed on Jul. 17, 2008, which claims the benefit of priority under 35 U.S.C. §119(e) of U.S. Provisional Application Ser. No. 60/966,049 filed on Aug. 24, 2007, both of which are hereby incorporated by reference for all purposes as if fully set forth herein.

BACKGROUND

A linear light-polarizing filter allows light having electric field in a certain plane to transmit at a higher rate than light having an orthogonal electric field. Polarizing filters have been widely used in, for example, ophthalmic products, display devices, imaging devices and optical communication devices. Polarizing ophthalmic lenses are interesting because they have the unique ability to preferentially eliminate glare that is reflected from smooth surfaces such as water and ice.

Dichroic materials have been used for the manufacture of light-polarizing articles. Dichroic materials, when properly oriented, can preferentially transmit light polarized in a particular direction. Dichroic materials can be polarizing over a relatively wide spectrum, such as the visible spectrum, or they may have the polarization property over a narrow range of wavelength.

Light-polarizing articles, such as polarizing ophthalmic lenses, have been manufactured by using various technologies and materials. Most of these products comprise a light-polarizing layer in addition to a non-polarizing substrate. The light-polarizing layer is mostly formed from the dichroic material mentioned above. Current methods for manufacturing polarizing articles have several drawbacks.

One problem is the distortion of the optical surface by the light-polarizing layer in the final product. Some of the light-polarizing articles are currently produced by laminating a pre-formed polarizing layer to a substrate. It is difficult, if not impossible, to allow the pre-formed polarizing layer to curve to a perfect fit with a contoured surface of the substrate, as is in the case of ophthalmic products. The less than perfect fit between the light-polarizing layer and the substrate can lead to undesired cylindrical power in an ophthalmic lens.

Most of the processes used for the manufacturing of polarizing articles are based on gluing or embedding organic polarizing films that must be purchased from polarizing film suppliers. Unfortunately, these processes can only be carried out at the lens-manufacturing site and not in a prescription laboratory. Moreover, films are difficult to be deformed so that they match the curvature radius of high power lenses without optical distortion. Thus, this process is limited to low power lenses Another technique suitable to prepare polarizing articles is based on the deposition of liquid crystal dyes directly on a substrate. The polarization efficiency being imparted by the alignment of dyes in the parallel grooves made on the substrate is known. The polarizing layer is easily made on the surface of the substrate by means of usual deposition processes regardless, to some extent, of the radius of curvature of the substrate. Among the deposition techniques available, dip coating or spin coating are preferred because they are easily compatible with a lab environment.

Although this method based on the deposition of oriented liquid crystal dyes is particularly convenient, the polarizing layer obtained is very sensitive to scratches due to the poor mechanical properties of organic dye layers. Moreover, the dyes are soluble in water at high temperature even when stabilized by ion exchange using multivalent metal salts such as barium chloride, aluminum chloride, and the like. Therefore such polarizing articles are quickly destroyed by scrapping and do not survive environmental testing such as water test or weathering tests generally required for ophthalmic and sun glass products.

For this reason, there is a need to apply a protective coating on the top of the polarizing layers in order to reinforce their mechanical and moisture resistance and to ensure acceptable durability. However, polarizing articles protected with a layer such as a UV-cured acrylic coating using techniques known in the art are not very durable. There is poor adhesion between the polarizing dye layer and the protective coatings, which may account for the reduced durability. Therefore there is a need for a simple and economically viable process for protecting a polarizing article having a polarizing dye on a support that provides enhanced adhesion between the polarizing dye layer and the protective coating.

SUMMARY

Described herein are polarizing articles and methods of making the same. The methods are useful in preparing polarizing articles having high durability and increased polarizing efficiency. The polarizing articles are useful in any article where it is desirable to reduce or remove glare. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
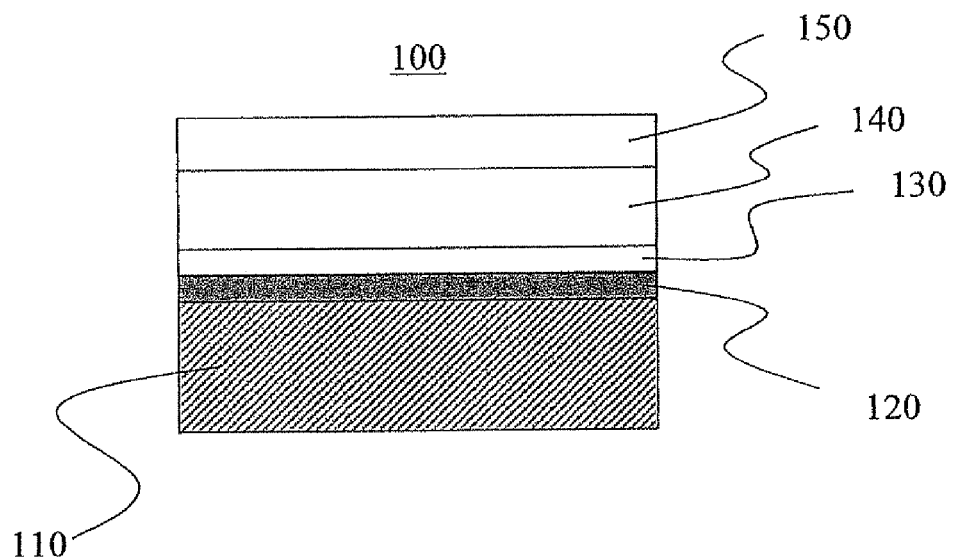
FIG. 1 shows a cross-sectional view of a polarizing article described herein.

Before the present methods and articles are disclosed and described, it is to be understood that the aspects described below are not limited to specific devices or methods, or uses as such may, of course, vary. It is also to be understood that the terminology used herein is for the purpose of describing particular aspects only and is not intended to be limiting.

It must be noted that, as used in the specification and the appended claims, the singular forms "a," "an" and "the" include plural referents unless the context clearly dictates otherwise. Thus, for example, reference to "a bulb" includes one or more bulbs.

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

The methods described herein produce polarizing articles with high durability. In one aspect, the method comprises:
a. depositing on the surface of a support one or more polarizing dyes to produce a polarizing support;
b. applying a polymer precursor to the polarizing support, wherein the polymer precursor comprises a urethane group, a urea group, an isocyanate group, or any combination thereof;
c. polymerizing the polymer precursor in situ on the polarizing support to produce a first polymer layer on the polarizing support, wherein the first polymer comprises a urethane group, a urea group, an isocyanate group, or any combination thereof, wherein the first polymer comprises at least one free isocyanate group; and
d. applying a protective layer to the first polymer layer.

Each component and step in the methods described herein are discussed below.

A. Support

In one aspect, the support can be made of inorganic glass or an organic polymer. Examples of inorganic glass include typical alkaline earth aluminosilicate glasses, boroaluminosilicate (Pyrex®) glasses, doped and undoped fused silica glasses, transparent glass-ceramic materials, and crystalline materials, such as $CaF_2$, $MgF_2$, and the like. In one aspect, when the polarizing article is an ophthalmic products, inorganic glass materials of special interest are those described in, for example, U.S. Pat. Nos. 4,839,314; 4404290; 4,540,672; 4,742,028; and 6,121,176, which are incorporated by reference.

Many polymer materials can be used to manufacture the support. Such polymers include, but are not limited to, polyamides, polyesters, polyimides, polysulfones, polycarbonates, polyurethanes, polyurethane-ureas, polyolefins, phenol resins, epoxy resins, and the like. In one aspect, homopolymers and copolymers of polyol (allylcarbonate) monomers such as the diethylene glycol bis(allyl carbonate) sold under the trademark CR-39® by PPG Optical Products, homopolymers and copolymers of mono or poly-functional (meth)acrylate, cellulose acetate, cellulose triacetate, cellulose acetate butyrate, cellulose acetate propionate, polyvinyl (acetate), poly(vinyl alcohol), poly (vinyl chloride), polyurethanes, polyurethane-urea such as TRIVEX™ or NXT® sold by PPG Optical Products and Intercast Europe Spa, respectively, poly (thiourethanes), polyamides, polycarbonates such as those derived from bisphenol-A and phosgene sold under the trade mark LEXAN®, polyesters such as poly(ethylene terephthalate), polystyrene, copolymers of styrene and methyl methacrylate or acrylonitrile, cyclic polyolefin copolymers (COC), amorphous polyolefin such as Zeonex® from ZEON Corp., and the like can be used to produce the support.

The support can be photochromic or non-photochromic. Non-limiting examples of photochromic inorganic glass materials and preparation thereof are disclosed, for example, in U.S. Pat. Nos. 5,426,077 and 5,023,209, which are incorporated by reference. Non-limiting examples of photochromic polymer materials and preparation thereof are disclosed, for example, in U.S. Pat. Nos. 6,248,285 and 6,329,482, which are also incorporated by reference.

The support can be colored or colorless. Colored inorganic glass materials and methods of making the same are described extensively in the art. Colored polymer materials may be produced by adding, for example, various organic dyes into the monomer before polymerization, or by impregnating the polymer matrix using organic dyes.

In certain aspects, an adhesion layer is applied to the surface of the support to enhance bonding between the polarizing dye and the support. The inorganic adhesion layer can be an oxide of silicon, a metal oxide or a compatible mixture and/or combination thereof. In one aspect, the inorganic adhesion layer is formed from SiO, $SiO_2$, $Al_2O_3$, $ZrO_2$, $TiO_2$, $GeO_2$, and mixtures and combinations thereof. In certain embodiments, the inorganic adhesion layer is formed of $SiO_2$. The inorganic adhesion layer is particularly useful when the support is composed of an organic polymer.

The thickness of the inorganic adhesion layer, if present, is on the microscopic scale. The thickness of the inorganic adhesion layer should be sufficient to allow the formation of the microgrooves without revealing the substrate surface. In certain embodiments of the light-polarizing article of the present invention the inorganic adhesion layer has a thickness less than 10 μm, less than 5 μm, or less than 1 μm. Generally, for plasma deposition, the thinner the coating, the less time is required for the deposition thereof.

For certain substrates, in order to obtain a strong adhesion between the inorganic adhesion layer and the support material, it is desired to form a thin inorganic sub-layer between the inorganic adhesion layer and the support. The sub-layer has a composition differing from that of the inorganic adhesion layer. The sub-layer is typically formed of silicon, an elemental metal, a metal oxide or an oxide of silicon. Non-limiting examples of elemental metals include chromium, molybdenum, nickel, titanium, iron and compatible combinations and/or mixtures thereof. Non-limiting examples of metal oxides include $Al_2O_3$, $ZrO_2$, $TiO_2$, $GeO_2$, and mixtures and combinations thereof.

The sub-layer is generally much thinner than the inorganic adhesion layer, usually on the nano-scale. Where the sub-layer is formed of an elemental metal, such as chromium, in order to ensure sufficient transmission, it is highly desired that the thickness thereof be very low. Typically, the sub-layer has a thickness of less than 300 nm, in certain embodiments less than 100 nm, in certain other embodiments less than 20 nm. The inorganic sub-layer may be a single layer of atoms or molecules.

In certain aspects, the support surface comprises a plurality of microgrooves. In one aspect, the microgrooves are substantially parallel to each other. The microgrooves can be sub-micron size (e.g., the width and depth of the grooves are desired to be less than 1 μm). The grooves serve to provide orientation of the polarizing dye molecules in the light-polarizing layer. In aspects where an inorganic adhesion layer is used, the microgrooves are formed after the application of the inorganic adhesive layer to the support. In this aspect, microgrooves are also formed in the inorganic adhesion layer.

The inorganic adhesion layer and the inorganic sub-layer can be applied to the support using techniques such as, for example, chemical vapor deposition (CVD) processes, such as plasma enhanced chemical vapor deposition (PECVD), low pressure chemical vapor deposition (LPCVD), sub-atmospheric chemical vapor deposition (SACVD); plasma vapor deposition (PVD) processes, such as ion-assisted electron beam evaporation, non ion-assisted electron beam evaporation and sputtering; as well as sol-gel processes, and the like.

In one aspect, the formation of microgrooves on the surface of the inorganic adhesion layer is advantageously achieved by brushing the surface. As a non-limiting example, a spinning wheel made of foam material, such as polyurethane form, soaked with a slurry of abrasive particles, can be used for brushing the surface. The slurry of the abrasive particles can be a polishing slurry typically used in the art. The abrasive particles usually are on a microscopic and sub-micron scale. Examples of such particles include, but are mot limited to, $Al_2O_3$, $ZrO_2$, $TiO_2$, $CeO_2$, and the like, as long as they have higher hardness than the surface to be abraded, such as the inorganic adhesion layer or the bulk material of the support. Additives, such as viscosity modifying agents, may be added into the slurry as well. One of ordinary skill in the art can adjust the rotation speed of the brushing wheel, the pressure applied, and other process parameters, when brushing to obtain an optimized brushing result in an optimized brushing time.

B. Polarizing Dye and Deposition on Support

The polarizing dye molecules useful herein can be dichroic dyes. Dichroic dyes useful herein include those disclosed in U.S. Pat. No. 2,400,877 and WO 00/22463. One or more dichroic dyes can be deposited on the support to impart the polarizing effect as well as a desired color or tint, such as grey, to the polarizing article. Non-limiting examples of commercially available polarizing dyes that can be used herein include, but are not limited to, C.I. Direct Blue 67, C.I. Direct Orange 72, C.I. Direct Red 83, C.I. Direct Green 59, C.I. Direct Violet 48, C.I. Acid Red 37, CI Direct Yellow 34, CI Direct Green 26, and CI Direct Green 51.

The amount of the polarizing dye molecules deposited on the support can vary depending on the particular dye used, the amount of dye needed to produce the desired polarizing effect, solubility of the polarizing dye(s) in the chosen solvent, the process by which the polarizing dye will be deposited on the support, and the like. The polarizing dye can be prepared as a composition including a solution, an emulsion or a suspension. In one aspect, the polarizing dye is from 0.1% to 8%, 0.5% to 8%, 1% to 6%, or 3% to 5% by weight of the total weight of the solution, emulsion, or suspension.

The polarizing dye composition can include additional components. In one aspect, the composition includes one or more non-ionic surfactants. In one aspect, the non-ionic surfactant comprises the formula (I):

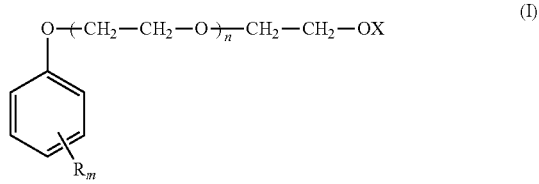

wherein:

the average of the number n of all the surfactant molecules ranges from 9 to 200, from 9 to 150, from 9 to 100, from 9 to 80, from 9 to 50, or from 10 to 50;

m is 1 or 2;

R is identical or different for each surfactant molecule and each occurrence, wherein each R is independently an alkyl group;

at least one R on each surfactant molecule is a C6-C12 straight-chain or branched alkyl, a C8-C10 straight-chain or branched alkyl, a straight-chain or branched C9-C10 alkyl, or a C9 straight-chain or branched alkyl; and X is identical or different for each surfactant molecule, wherein X is hydrogen or a C1-C4 alkyl.

The non-ionic surfactant material having formula (I) is available commercially. For example, the following surfactants and combinations thereof can be used herein: Tergitol® NP40, Tergitol® NP10 available from Union Carbide Chemicals & Plastics Technology Corp., Igepal® CO 720, Igepal® CO 890, Igepal® CA 720, Igepal® DM 970 from GAF Corp., Lutensol® NP100, Lutensol® NP10 from BASF. The amount of the non-ionic surfactant material present in the polarizing dye composition can range from 0.1% to 10%, from 0.2% to 5%, or from 0.4% to 1%, by weight of the total weight of the dispersion.

In addition to water, the polarizing dye and the non-ionic surfactant molecules, additional components can be included in the polarizing composition including, but not limited to, (i) other solvents such as alcohol, if needed; (ii) other surfactants, such as an anionic surfactant, a cationic surfactant, an amphoteric surfactant, or mixtures and combinations thereof; (iii) adhesion promoting agents; (iv) plasticizers; (v) non-polarizing dyes for imparting a desirable color or hue to the end product, and the like, as long as (a) these other ingredients do not significantly negatively impact the adhesion of the polarizing layer to the other layers in the structure of the article, and (b) do not significantly negatively impact the polarizing effect of the polarizing dyes in the polarizing dye layer.

The polarizing dye composition of the present invention can be prepared in various ways. One approach involves dissolving the polarizing dye molecules and other optional components in a solvent to form a single dispersion. This approach can be advantageous if the composition is used in a short period of time. In other aspects, the polarizing dye can be dispersed in a solvent, such as water, to form a first composition, while other components (e.g., the non-ionic surfactant) are dispersed in the same or a differing solvent, to form a second composition, and the first and second compositions are mixed together shortly before use. This two-step approach can be advantageous, especially if the polarizing dye composition comprising all necessary ingredients is not sufficiently stable for prolonged storage and shipping, whereas the first and second dispersions are stable before they are mixed.

The formation of the polarizing layer involves depositing one or more polarizing dyes on the surface of the support. In one aspect, polarizing dye composition is coated on the surface of the support, where the support has a plurality of microgrooves as described above. The deposition of the polarizing dye composition can be performed by using various coating techniques available in the art such as, for example, dip coating, flow coating, spin coating, spray coating, and the like, using conventional equipment.

In certain aspects, after depositing the polarizing dye on the surface of the substrate, the polarizing dye can be insolubilized and immobilized (i.e., stabilized) on the support surface. In one aspect, the coated substrate is exposed to an aqueous solution of a metal salt in order to stabilize the dye. U.S. Pat. No. 2,400,877 discloses methods and agents used for stabilizing polarizing dyes, which are incorporated by reference. Examples of metal salts include, but are not limited to, of $AlCl_3$, $BaCl_2$, $CdCl_2$, $ZnCl_2$, $SnCl_2$, and the like. Generally, metal salts used in textile industry for insolubilizing dyes in water can be used. For example, metal salts of Al, Fe, Cr, Ca, Mg, and the like, can be used. In addition, the composition for insolubilizing the dye can be a buffered solution or dispersion containing multiple acids, salts and/or bases of various metals. For example, one combination used for insolubilizing certain sulphonic group-bearing polarizing molecules is an aqueous dispersion including: (i) $AlCl_3$, (ii) $Mg(OH)_2$, and (iii) $Ca(OH)_2$, at a pH of about 4. The result of such insolubilization by metal salts is the precipitation of the polarizing dye molecules in the form of salts having low solubility in water at room temperature.

In order to obtain a high polarizing efficiency of the article, it is desired that the polarizing dyes, with or without the aid of additives such as liquid crystal polymers, align in a parallel matter, such as in the direction of the micro-grooves. It is desired that, in certain embodiments, that the light-polarizing layer is essentially a single layer. This would allow for precise alignment of the polarizing dye molecules and thus a high polarization efficiency.

C. Coupling Agents

In certain aspects, one or more coupling agents can be applied to the support with the polarizing layer. In general, the coupling agent possesses certain structural features that can further immobilize the polarizing dye molecules on the support as well as well as enhance the bonding between the polarizing layer and subsequent layers. For example, the coupling agent possesses groups that can react with groups on a polymer layer that is applied over the polarizing layer to form strong and durable chemical bonds. Additionally, the coupling agent can form covalent or non-covalent (e.g., electrostatic, ionic, etc.) bonds with the polarizing dye, which further stabilizes the polarizing layer.

In certain aspects, two or more coupling agents can be used. In one aspect, a first and second coupling agent are applied to the polarizing layer immobilized on the support. The first and second coupling agent can be added concurrently or sequentially depending upon the selection of the coupling agents. In one aspect, the first coupling agent comprises a straight or branched-chain aminosilane, aminoalkoxysilane, aminoalkylsilane, aminoarylsilane, aminoaryloxysilane, or a derivative or salt thereof. Examples of first coupling agents useful herein include, but are not limited to, polymers of: γ-aminopropyltrimethoxysilane, γ-aminopropyltriethoxysilane, N-β-(aminoethyl)-γ-aminopropyltrimethoxysilane, N-β-(aminoethyl)-γ-aminopropyltriethoxysilane, and mixtures and combinations thereof. The amount of first coupling agent applied to the polarizing layer can vary. In certain aspects, the first coupling agent is added in an amount such that a layer having a thickness of less than 1 μm, from 5 nm to 500 nm, from 5 nm to 200 nm, from 5 nm to 100 nm, or from 5 nm and 50 nm is formed.

The second coupling agent differs from the first coupling agent in terms of structure and/or composition. In certain aspects, the second coupling agent can react with the first coupling layer at the interface to form covalent bonds and/or hydrogen bonds to achieve a high bonding strength between them. Additionally, the second coupling agent possesses groups that can form covalent or non-covalent bonds with functional groups present on polymer layers subsequently applied to the polarizing layer. With the use of two coupling agents, a strong network of polarizing dye at the support surface is formed. In one aspect, the second coupling agent comprises an epoxyalkyltrialkoxysilane. Examples of epoxyalkyltrialkoxysilanes include, but are not limited to, γ-glycidoxypropyltrimethoxysilane, γ-glycidoxypropylpentamethyldisiloxane, γ-glydicoxypropylmethyldiisopropenoxysilane, (γ-glycidoxypropyl)methyldiethoxysilane, γ-glycidoxypropyldimethylethoxysilane, γ-glycidoxypropyldiisopropylethoxy silane, (γ-glycidoxypropyl)bis(trimethylsiloxy)methylsilane, trimethoxy[2-(7-oxabicyclo[4.1.0]hept-3-yl)ethyl]silane, and any combination thereof.

In another aspect, after contacting the polarizing support with the second coupling agent as described above, the polarizing support is contacted with the following in order: (1) a third coupling agent, wherein the third coupling agent comprises a straight or branched-chain aminosilane, aminoalkoxysilane, aminoalkylsilane, aminoarylsilane, aminoaryloxysilane, or a derivative or salt thereof, and (2) a fourth coupling agent, wherein the fourth coupling agent comprises an epoxyalkyltrialkoxysilane. The third and fourth coupling agents can be the same or different from the first and second coupling agents, respectively. In one aspect, the first and third coupling agents comprise 3-aminopropyl trialkoxysilane and the second and fourth coupling agents comprise a glycidoxypropyltrialkoxysilane.

D. Polymer Precursors and In Situ Polymerization

As described above, there is a need to protect polarizing articles with a durable protecting layer. The methods described herein address this need by producing in situ an intervening polymer layer that has improved adhesion with the protecting layer. In particular, the process comprises (1) applying a polymer precursor to the polarizing support, wherein the polymer precursor comprises a urethane group, a urea group, an isocyanate (NCO) group, or any combination thereof; and (2) polymerizing the polymer precursor in situ on the polarizing support to produce a first polymer layer on the polarizing support, wherein the first polymer comprises a urethane group, a urea group, an isocyanate group, or any combination thereof, wherein the first polymer comprises at least one free isocyanate group.

The polymer precursors are any compounds that undergo polymerization using techniques known in the art. For example, the polymer precursor comprises at least one ethylenically unsaturated group capable of undergoing free radical polymerization. The phrase "ethylenically unsaturated group" is defined herein as a carbon-carbon double bond. In these aspects, the polymer precursor can possess one or more ethylenically unsaturated groups. The polymer precursor can be the same or different compounds. Thus, homopolymers and copolymers can be produced during in situ polymerization.

In one aspect, the ethylenically unsaturated group is derived from an allyl compound, vinyl compound, an acrylate, or a methacrylate. In another aspect, polymer precursor comprises the reaction product between a polyisocyanate (i.e., a compound having at least two isocyanate groups) and a hydroxylated aliphatic acrylate or methacrylate; a hydroxylated aromatic acrylate or methacrylate; an aminated aliphatic acrylate or methacrylate; or an aminated aromatic acrylate or methacrylate. In one aspect, the polymer precursor is class of aliphatic urethane acrylates possessing NCO groups sold under the tradename Roskydal UA manufactured by Bayer (e.g., Roskydal UA-VPLS 2337).

In another aspect, the polymer precursor comprises a compound having two or more isocyanate groups (e.g., a polyisocyanate) and a compound possessing two or more isocyanate reactive groups. Examples of isocyanate reactive functional groups include amine groups, hydroxyl groups, thiol groups, and other nucleophiles that can react with an isocyanate. In this aspect, a urethane group or urea group is produced. In one aspect, a polyol, polyamine, polyester polyol, polyether polyol, polycarbonate polyol, a hydroxyl bearing polyacrylate or polymethacrylate can react with the polyisocyanate to produce a polymer in situ.

The application of the polymer precursor to the polarizing support can be performed using techniques known in the art including, but not limited to, spin coating, dip coating, or flow coating. The sequence of applying the polymer precursor to the polarizing support can vary depending upon the precursors selected. For example, when the polymer precursor comprises two or more acrylates or methacrylates, the compounds can be admixed and applied to the polarizing substrate. Alternatively, if the polymer precursor is a polyisocyanate, the polyisocyanate can be applied first to the polarizing support followed by the addition of a compound possessing two or more isocyanate reactive groups (e.g., a polyol).

In certain aspects, it may be desirable to protect the isocyanate group on the polymer precursor so that it is not reactive with an isocyanate-reactive compound. This is referred to herein as a "blocked" isocyanate. Conversely, "unblocked" isocyanates possess at least one free NCO group. Blocked isocyanates and techniques for producing the same are known in the art. Blocked isocyanates are useful when the solvent is water, an alcohol, or other solvents that can react with an isocyanate group. The blocked isocyanate can be unblocked using techniques known in the art, which includes exposing the blocked isocyanate to heat. Examples of commercially-available blocked isocyanates include Witcobond® products available from Baxenden Chemicals.

The molecular weight of the polymer precursor can vary. Thus, the polymer precursor can be a monomer, dimer, prepolymer, or oligomer. Additionally, the polymer precursor can include other components. For example, one or more coupling agents described above can be mixed with the polymer precursor and applied to the polarizing support. The polymer precursor can be prepared as a solution in one or more solvents prior to applying the precursor to the polarizing solvent. In the case when the polymer precursor has isocyanate groups, the solvent is selected so that the solvent does not adversely react with the isocyanate groups.

The in situ polymerization of the polymer precursor can be performed using techniques known in the art. The phrase "in situ polymerization" is defined herein as polymerization that occurs on the surface of the polarization support. Depending upon the selection of the polymer precursors, some polymerization may occur prior to applying the polymer precursor to the polarizing support; however, the majority of polymerization occurs on the polarizing support. In one aspect, when the polymer precursor comprises one or more ethylenically unsaturated compounds, polymerization can be initiated by exposing the ethylenically unsaturated compounds on the polarizing support to electromagnetic radiation such as, for example, UV, visible, or IR radiation. Alternatively, the polarizing support can be exposed to an electron beam to initiate polymerization. The amount and duration of energy applied to the polarizing support will vary depending upon the amount of polymer precursor applied to the support.

The amount of polymer precursor applied to the polarizing support prior to polymerization will determine the thickness of the polymer layer ultimately produced. The thickness of the polymer layer can vary depending upon the end-use of the polarizing article. The polymer layer can provide a "cushion" between the polarizing support and the protective layer. Thus, in certain aspects, it may be desirable to have a thicker polymer layer present where the polarizing article is subjected to physical contact that may compromise the polarizing layer. Additionally, as will be discussed below, the polymer layer can strongly adhere to the protective layer, which ultimately increases the durability of the polarizing article. In certain aspects, the polymer layer has a thickness of 0.05 microns to 20 microns, 0.5 microns to 20 microns, 1 micron to 20 microns, 1 micron to 20 microns, or 5 microns to 10 microns.

After in situ polymerization, the first polymer layer is adjacent to the polarizing support. The term "adjacent" includes the situation where the polymerized layer is in intimate contact with the polarizing support. In the alternative, the polymerized layer is "adjacent" to the polarizing support when the polymerized layer is in close proximity to the polarizing support. Here, an intervening layer is present between the polarizing support and the polymerized layer. The term "adjacent" is also applicable to other layers present in the polarizing device (e.g., the protective layer).

The polymerized layer after in situ polymerization possesses free isocyanate groups. The amount of free isocyanate groups present can vary depending the selection of the polymer precursor and polymerization conditions. As will be discussed below, the presence of free isocyanate groups can enhance the adhesion between the protective layer and the polarizing support. However, the amount of isocyanate groups should be balanced with the potential for bubble formation when the isocyanate groups react with water. When water reacts with the isocyanate groups, constellations of small carbon dioxide bubbles can form. The bubbles can ultimately result in the formation of an unacceptable polarizing article. The reactivity of the isocyanate groups with water can vary. In the case of aromatic isocyanates, the isocyanate groups are particularly reactive with water; therefore, lower amounts of free isocyanate groups are present in the polymerized layer. Alternatively, aliphatic isocyanates are more stable. Thus, higher amounts of free isocyanate groups can be present in the polymerized layer. In one aspect, the amount of free isocyanate groups present in the polymerized layer is less than 20% by weight. In one aspect, when the polymerized layer is derived from an aliphatic isocyanate, the amount of free isocyanate groups present in the polymerized layer is from 5% to 20%, 5% to 15%, 6% to 15%, or 6% to 13% by weight of the polymerized layer. In another aspect, when the polymerized layer is derived from an aromatic isocyanate, the amount of free isocyanate groups present in the polymerized layer is from 0.5% to 2%, 0.5% to 1.5%, or 0.5% to 1.0% by weight of the polymerized layer.

In one aspect, the polymer precursor is prepared from an aliphatic isocyanate (e.g., reaction between an aliphatic isocyanate and a hydroxyalkyl acrylate or methacrylate). Examples of aliphatic isocyanates, which also include cyclo and cycloaliphatic compounds, include hexamethylene diisocyanate; cyclohexane-2,4-diisocyanate; cyclohexane-2,3-diisocyanate; 1-methyl cyclohexyl-2,4-diisocyanate; 1-methyl cyclohexyl-2,6-diisocyanate; bis-(isocyanatocyclohexyl-) methane; 2,4,6-triisocyanatotoluene; 1-isocyanato-3,3,5-trimethyl-5-isocyanato-methylcyclohexane, 4,4'-diisocyanato-dicyclohexyl methane; 4,4'-diisocyanatodicyclohexyl propane-(2,2); biuret of hexamethylene diisocyanate, or mixtures thereof.

E. Protective Layer

The protective layer can be any number of polymers that protect the polarizing support. For example, the protective layer can impart anti-scratch or anti-abrasive properties to the article. The protective layer can applied using techniques known in the art. In one aspect, the polymer can be prepared first, followed by coating the first polymer layer with the protective polymer. Alternatively, one or more precursors to the protective layer, which are different than the polymer precursors described above, can be applied to the first polymer layer and subsequently polymerized in situ. For example, the precursor could have one or more ethylenically unsaturated groups that can undergo free radical polymerization by exposing to light.

In other aspects, when there are free isocyanate groups present on the first polymer layer, the protective layer comprises a polymer comprising a functional group that reacts with the isocyanate group. In this aspect, the protective layer reacts with the isocyanate groups to form new covalent bonds. For example, the protective layer has one or more hydroxyl, amino, or thiol groups that can react with the isocyanate. In one aspect, the protective layer comprises a polyol, a hydroxy polyacrylate, or a polyester polyol. In another aspect, the protective layer is produced by (1) applying a UV-curable monomer comprising at least one isocyanate-reactive group on the surface of the first layer and (2) exposing the UV-curable monomer to light to polymerize the UV-curable monomer. Examples of UV-curable monomers include, but are not limited to, a hydroxyalkyl acrylate, a hydroxyalkyl methacrylate, an aminoalkyl acrylate, an aminoalkyl methacrylate, an allyl alcohol, a vinyl alcohol, or any combination thereof. In another aspect, the UV-curable monomer includes hydroxyethyl (meth)acrylate, hydroxypropyl(meth)acrylate, glycerol (meth)acrylate, or bisphenol-A glycerolate di(meth) acrylate. After applying the protective layer to the first polymer layer, the coated article can be thermally cured to produce the finished article.

If necessary, additional layers can be applied over the protective layer. These coatings include, but are not limited to, hydrophobic (water-repellent or anti-fog) coatings; infrared absorbing coatings; UV absorbing coatings; anti-reflective coatings; photochromic coatings; cushion coatings (shock-absorbing flexible coatings); and the like. These coatings may also be formed on the side of the substrate opposite to the inorganic adhesion layer, the optional sub-layer and the light-polarizing layer.

F. Properties of the Polarizing Articles and Applications Thereof

The methods described herein produce polarizing articles with increased durability and polarizing efficiency. In one aspect, the polarizing article comprises:
(a) a polarizing support comprising at least one polarizing dye deposited on a surface of a support;
(b) a first polymer layer adjacent to the support and the polarizing dye, wherein the first polymer comprises a urethane group, a urea group, an isocyanate group, or any combination thereof, wherein the first polymer layer is formed in situ on the surface of the support, and wherein the first polymer comprises at least one free isocyanate group; and
(c) a protective layer disposed above the polymerized layer opposite the polarizing support.

In another aspect, the polarizing article comprises:
(a) a support comprising a surface, wherein one or more polarizing dyes are adjacent to the surface of the support;
(b) a first polymer layer adjacent to the support and the polarizing dye, wherein the first polymer comprises a urethane group, a urea group, an isocyanate group, or any combination thereof, wherein the first polymer layer is formed in situ on the surface of the support; and
(c) a protective layer covalently attached to the first polymer layer,
wherein the article (i) passes the dry adhesion test and hot water adhesion test, and (ii) the article has a polarization efficiency greater than 95%.

Figure 2:
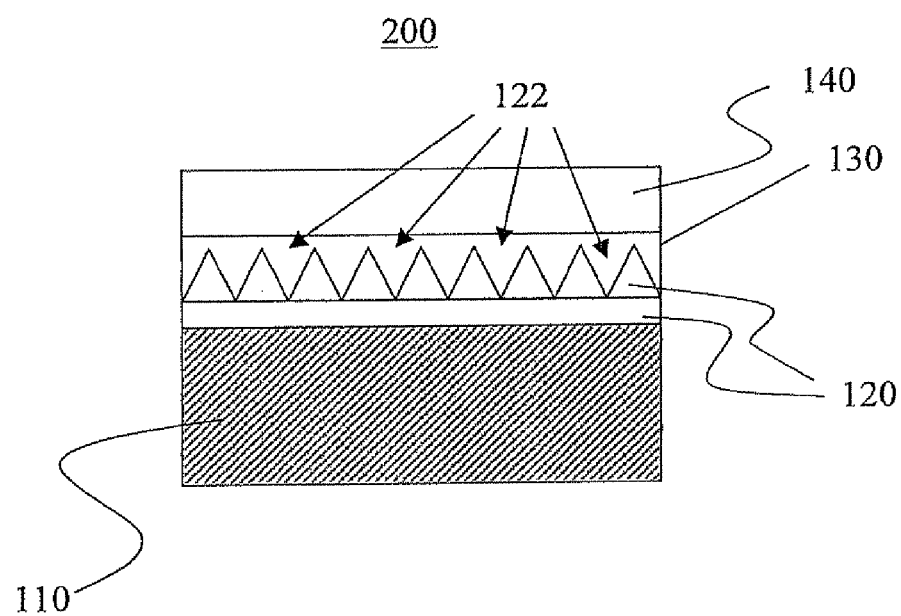
FIG. 2 shows a cross-sectional view of a polarizing article described herein with a plurality of microgrooves.

FIG. 1 shows a cross-sectional view of a polarizing article described herein. Polarizing article 100 has the following layered structure: (1) a support 110; (2) an inorganic adhesion layer 120 adjacent to the support; (3) a polarizing layer 130 adjacent to the inorganic adhesion layer 120; (4) a polymerized layer 140 adjacent to the polarizing layer 130; and (5) a protective layer 150 adjacent to the protective layer 140. FIG. 2 depicts polarizing article 200 with a plurality of microgrooves 122 in the inorganic adhesion layer 120. A polarizing layer 130 is adjacent to the inorganic adhesion layer 120, where polarizing molecules are incorporated into the microgrooves 122. The polymerized layer 140 is adjacent to the polarizing layer 130. The protective layer is not depicted in FIG. 2.

With respect to durability, the polarizing articles are stable under harsh conditions that the polarizing article could be exposed to. The stability is the result of, among other things, the ability of the protective layer to adhere to the polarizing support through the polymerized layer. For example, the protective layer has good adhesion to the polarizing support and, thus, better durability. In one aspect, the polarizing article passes the adhesion test. Measuring adhesion in the dry state by tape test is made accordingly to ASTM D3359 Method B. "Passing" means that the rating is at least 4B as defined in D3359 (e.g., small flakes of the coating are detached at the intersection and less than 5% of the area is affected).

The polarizing articles described herein are water resistant. In one aspect, the polarizing article passes the hot water resistance adhesion test. The hot water test involves soaking the polarizing article for three hours in hot water (90° C.) and then applying the following adhesion test. An adhesive tape is applied onto the protective layer and rubbed to ensure a good contact. The tape is removed by seizing the free end and rapidly pulling off the tape as close to an angle of 180° as possible. A "passing" rating is when the coating continues to adhere to the substrate after removal of the tape.

In another aspect, the polarizing article further passes the artificial acidic sweat test, which simulates exposing the polarizing article to human sweat. The test involves soaking the polarizing article in an aqueous solution of lactic acid and sodium chloride, where the solution has a pH of approximately 1.2. The article is soaked for 5 hours at 50° C. then the article is rinsed and dried. The adhesion test as described above for the hot water test is then applied with the same criteria for passing and failing.

In certain aspects, the polarizing articles described herein also do not form microbubbles when exposed to water. The formation of microbubbles can reduce the polarizing efficiency of the article as well as render the article aesthetically unappealing. For example, when the polarizing article is soaked in water for three hours at 90° C., no microbubbles are detected by visual inspection.

In addition to improved durability, the polarizing articles exhibit increased polarization efficiency. The polarization efficiency can be determined by measuring the parallel transmittance and perpendicular transmittance using a visible spectrophotometer and a polarizer. The polarization efficiency is then calculated using the following formula:

$$P_{eff}=100\times[(T\text{ parallel}-T\text{ perpendicular})/(T\text{ parallel}+T\text{ perpendicular})]$$

In one aspect, the polarization efficiency is greater than 95%, greater than 96%, greater than 97%, greater than 98%, or greater than 99%.

The polarizing articles described herein can be used to produce a number of different devices and articles. Non-limiting examples of applications include: ophthalmic products (e.g., sunglass lenses), display products (e.g., liquid crystal displays, including LCD monitors and LCD projectors), polarizing windows for vehicles (e.g., land-based, air-born and water-based vehicles), facemasks, shields, building glass, and the like.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

A polarizing lens was made by the following steps:

Step 1: A 1.8 mm thick plano lens made of Corning GX 15 standard glass, which was modified so that it has a luminous transmission factor of 40% at 1.8 mm, was brushed with a wheel made of polyurethane foam having the appropriate shape. The wheel was imbibed with an abrasive slurry in order to form parallel microgrooves on the surface of the coated lens. The abrasive slurry used was a mixture of water and micron size alumina particles in order to provide a gentle abrasive brushing. The wheel speed was 340 rpm and the pressure was about 40 g/cm². The wheel was applied to the support for about 15 seconds to produce microgrooves. The grooved lens was rinsed with deionized water. The lens was coated with about 2 grams of an aqueous solution containing about 5% wt of polarizing dyes (Varilight solution 2S supplied by Sterling Optics Inc [KY]) and 1% of surfactant made of a mixture of 30% Igepal CO720 and 70% of Tergitol NMP40. The dye solution was applied to the support by spin coating at 300 rpm for 8 sec.

Step 2: The polarizing coating was stabilized by immersing the lens in an aqueous solution containing aluminum chloride, calcium hydroxide, and magnesium hydroxide at pH 4 for 30 seconds. This step converts the water-soluble dye into its water insoluble form. After rinsing with deionized water, the lens was immersed in a 10 wt % aminopropyltriethoxy silane aqueous solution for 15 minutes, then rinsed with distilled water and dried under a gentle laminar nitrogen flow. The lens was thermally cured at 125° C. for 30 minutes.

Step 3: The lens was immersed in a 2 wt % glycidoxypropyl trimethoxy silane aqueous solution for 30 minutes. The lens was rinsed with distilled water and dried under a gentle laminar nitrogen flow. The lens was thermally cured at 100° C. for 30 minutes.

Step 4: Reactive urethane solution preparation: Polycaprolactone triol 900 (0.15 g; 5 $10^{-4}$ OH) was added to 20 g of a reactive urethane-urea solution based on aromatic toluene diisocyanate (2.6 $10^{-3}$ moles NCO, 25% solid in toluene 25%/ethyl acetate 45%/PMA 5%) and stirred under dry atmosphere until a homogeneous mixture was produced.

Step 5: The reactive urethane solution from step 4 was applied to the lens by spin coating at 1000 rpm for 45 seconds. The coated lens was left undisturbed for 24 hrs at room temperature. The final thickness of the polymer layer was about 7 μm. The final polymer layer contained about 1.7 wt % free isocyanate based on solids.

Step 6: SHC180 anti-scratch coating resin from LTI was applied onto the top of the crosslinked reactive urethane layer at 1000 rpm for 45 seconds. The lens was UV-cured using a fusion lamp equipped with an H bulb (2 passes at 80% electric power, 1.7 cm/sec) to produce the finished lens.

Example 2

Steps 1-3: The 3 first steps from Example 1 were reproduced except that the thermal curing from Step 3 was omitted.

Step 4: An aqueous solution containing 0.30% of precondensed aminopropyl triethoxysilane was applied to the lens by spin coating at 2000 rpm for 45 seconds.

Step 5: A UV-crosslinkable reactive urethane solution was prepared by mixing 0.17 g of Irgacure 184 (from Ciba Geigy), 16.00 g of isopropyl acetate (from Sigma Aldrich) as solvent, 3.64 g of Roskydal VP LS 2337 as reactive urethane resin (from Bayer), and 0.19 g of glycidoxypropyl trimethoxysilane as adhesion promoter until a homogenous solution was obtained.

Step 6: The UV-crosslinkable reactive urethane solution produced in Step 5 was applied to the lens at 1000 rpm for 45 seconds. The coated lens was dried at room temperature for 2 minutes.

Step 7: The UV-crosslinkable reactive urethane layer was crosslinked by exposure to UV light using the fusion H-bulb (1 pass at 80% electric power, 1.4 cm/sec).

Step 8: SHC180 anti-scratch coating resin from LTI was applied on the top of the crosslinked reactive urethane layer by spin coating at 1000 rpm for 45 seconds and UV-cured using a fusion lamp equipped with an H bulb (2 passes at 80% electric power, 1.4 cm/sec).

Step 9: The lens was thermally post-cured at 100° C. for 5 hours in an oven.

Comparative Example 1

A polarizing lens was prepared as described in Example 1 except that a SDC PR-1135® cushion layer based on non-reactive polymer (i.e., no free isocyanate groups) is used instead of the reactive urethane solution in Example 1.

Comparative Example 2

A polarizing lens was prepared as described in Example 1 except that the NCO content of the reactive urethane-urea solution based on aromatic toluene diisocyanate was $7 \times 10^{-3}$ moles NCO. The final polymer layer after in situ polymerization contained about 5.3 wt % free NCO based on solids.

Lens Testing

Optical Performance

Polarization efficiency was determined by measuring the parallel transmittance and perpendicular transmittance using a visible spectrophotometer and a polarizer. The Polarization efficiency was calculated using the following formula:

$P_{eff}=100\times[(T\,\text{parallel}-T\,\text{Perpendicular})/(T\,\text{parallel}+T\,\text{perpendicular})]$ Hot-Water Resistance Moisture resistance was evaluated by soaking each polarizing lens for 3 hours in hot water at 90° C. The optical properties were checked and adhesion was evaluated using the adhesive test described below without scoring the surface.

Bubble Formation

Each lens was soaked in hot water for three hours and the lenses were visually inspected in order to see if bubbles were generated. If microbubbles were present the lens is rated as having failed ("fails").

Adhesion Test

Adhesion of the protective layer of each lens was evaluated before and after the hot water test using a modified crosshatch ASTM D3359 adhesion test. The surface of the anti-scratch coating was scored using a razor blade. The spacing between cuts was 1 mm and the scored pattern consists of 10×10 cuts. Adhesion was the evaluated by applying a 3M 610 pressure sensitive adhesive tape over cuts made in the coating and quickly peeling off the tape. After the tape was pulled off, the cut area was inspected and rated.

Artificial Acidic Sweat Test

Each lens was soaked for 5 hours in an aqueous mixture at 50° C. The aqueous mixture was prepared by mixing 50 g of lactic acid and 100 g NaCl in 900 mL of deionized water. The pH of the solution was about 1.2. Each lens was rinsed and dried. Adhesion was evaluated using the adhesion test and visual inspection. The lenses are rated as having "failed" when low adhesion or cosmetic defects are observed.

The results are shown in Table 1.

TABLE 1

| | Example 1 | Example 2 | Comparative Example 1 | Comparative Example 2 |
|---|---|---|---|---|
| Polarization efficiency (%) | 98% | 98% | 98% | 98% |
| Adhesion before hot water | pass | pass | pass | pass |
| Adhesion after Hot water | pass | pass | failed | pass |
| Artificial acidic sweat test | pass | pass | failed | pass |
| Bubbling | pass | pass | pass | failed |

The lenses produced in Examples 1 and 2, which were produced by the methods of the invention, passed each test and exhibited high polarization efficiency. In Comparative Example 1, where there are no free isocyanate groups present in the urethane layer, adhesion in the dry state (before hot water) is good but fails the hot water test. Additionally, the lens failed the hot artificial sweat test (i.e., degradation of the dye layer starting from the edge of the lens). In Comparative Example 2, bubbling occurred after soaking the lens in hot water and produced an unacceptable lens.

Throughout this application, various publications are referenced. The disclosures of these publications in their entireties are hereby incorporated by reference into this application in order to more fully describe the methods and articles described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

The invention claimed is:

1. A method for producing a polarizing article, the method comprising:
   a. depositing on a surface of a support one or more polarizing dyes to produce a polarizing support;
   b. applying a polymer precursor to the polarizing support, wherein the polymer precursor is derived from an aromatic polyisocyanate;
   c. polymerizing the polymer precursor in situ on the polarizing support to produce a polymer layer on the polarizing support, wherein the polymer layer comprises a urethane group, a urea group, an isocyanate group, or any combination thereof, and wherein polymer layer has from 0.5% to 2% by weight free isocyanate groups; and
   d. applying a protective layer to the polymer layer.

2. The method of claim 1, wherein the support comprises an inorganic glass with a plurality of parallel grooves on the surface.

3. The method of claim 1, wherein when the support comprises an organic material having a first surface and, prior to step (a), applying an inorganic adhesion layer on the first surface of the support.

4. The method of claim 1, wherein the depositing step (a) comprises contacting the surface of the support with an aqueous solution comprising one or more polarizing dyes.

5. The method of claim 4, wherein the aqueous solution further comprises a non-ionic surfactant.

6. The method of claim 1, wherein after step (a) and prior to step (b), contacting the polarizing support with an aqueous solution of inorganic salts.

7. The method of claim 1, wherein after step (a) and prior to step (b), contacting the polarizing support with a first coupling agent, wherein the first coupling agent comprises a straight or branched-chain aminosilane, aminoalkoxysilane, aminoalkylsilane, aminoarylsilane, aminoaryloxysilane, or a derivative or salt thereof.

8. The method of claim 7, further comprising after contacting the polarizing support with the first coupling agent, contacting the polarizing support with a second coupling agent comprising an epoxyalkyltrialkoxysilane prior to step (b).

9. The method of claim 8, wherein after contacting the polarizing support with the second coupling agent, contacting the polarizing support in the following order with: (1) a third coupling agent, wherein the third coupling agent comprises a straight or branched-chain aminosilane, aminoalkoxysilane, aminoalkylsilane, aminoarylsilane, aminoaryloxysilane, or a derivative or salt thereof, and (2) a fourth coupling agent, wherein the fourth coupling agent comprises an epoxyalkyltrialkoxysilane.

10. The method of claim 1, wherein the polymer precursor comprises the reaction product between an aromatic polyisocyanate and a hydroxylated aliphatic acrylate, a hydroxylated methacrylate, a hydroxylated aromatic acrylate, hydroxylated methacrylate, an aminated aliphatic acrylate, an aminated methacrylate, an aminated aromatic acrylate, or an aminated methacrylate.

11. The method of claim 1, wherein step (c) comprises (1) applying the polymer precursor to the entire surface of the polarizing support and (2) exposing the polymer precursor to electromagnetic radiation or an electron beam.

12. The method of claim 11, wherein the polymer precursor is exposed to UV radiation.

13. The method of claim 1, wherein the protective layer is produced by (1) applying a UV-curable monomer comprising at least one isocyanate-reactive group on the surface of the polymer layer and (2) exposing the UV-curable monomer to light to polymerize the UV-curable monomer, wherein the protective layer is covalently bonded to the polymer layer.

14. The method of claim 13, wherein the UV-curable monomer comprises a hydroxyalkyl acrylate, a hydroxyalkyl methacrylate, an aminoalkyl acrylate, an aminoalkyl methacrylate, an allyl alcohol, a vinyl alcohol, or any combination thereof.

* * * * *